United States Patent
Weller et al.

(10) Patent No.: US 9,485,037 B1
(45) Date of Patent: Nov. 1, 2016

(54) COMPACT DUAL-CHANNEL TRANSCEIVERS

(71) Applicants: Thomas McCrea Weller, Lutz, FL (US); Ibrahim Turki Nassar, Tampa, FL (US)

(72) Inventors: Thomas McCrea Weller, Lutz, FL (US); Ibrahim Turki Nassar, Tampa, FL (US)

(73) Assignee: University of South Florida, Tampa, FL (US)

( * ) Notice: Subject to any disclaimer, the term of this patent is extended or adjusted under 35 U.S.C. 154(b) by 231 days.

(21) Appl. No.: 14/090,277

(22) Filed: Nov. 26, 2013

(51) Int. Cl.
*H04B 1/60* (2006.01)
*H04B 17/02* (2006.01)

(52) U.S. Cl.
CPC ................................ *H04B 17/02* (2013.01)

(58) Field of Classification Search
None
See application file for complete search history.

(56) References Cited

U.S. PATENT DOCUMENTS

| | | | |
|---|---|---|---|
| 9,093,741 B1 | 7/2015 | Weller et al. | |
| 2006/0290491 A1* | 12/2006 | Wagner | G06Q 10/08 340/539.26 |
| 2007/0183439 A1* | 8/2007 | Osann, Jr. | H01Q 25/00 370/406 |
| 2009/0262030 A1* | 10/2009 | Zweers | H01Q 1/243 343/702 |
| 2010/0002620 A1* | 1/2010 | Proctor, Jr. | H01Q 1/521 370/315 |
| 2015/0047436 A1* | 2/2015 | Yi | G01N 3/02 73/775 |

OTHER PUBLICATIONS

Nassar et al., A Compact 3-D Harmonic Repeater for Passive Wireless Sensing, IEEE Transaction on Microwave Theory and Techniques, vol. 60, No. 10, Oct. 2012, pp. 3309-3316.*

* cited by examiner

*Primary Examiner* — Mohammed Rachedine
(74) *Attorney, Agent, or Firm* — Thomas | Horstemeyer, LLP (57) ABSTRACT

In one embodiment, a dual-channel transceiver includes two harmonic repeaters each having a receive antenna, a transmit antenna, and a frequency multiplier connected to the antennas that is configured to increase the frequency of a signal received by the receive antenna to enable transmission by the transmit antenna of a reply signal having a higher frequency, wherein the harmonic repeaters operate at different frequencies from each other.

9 Claims, 10 Drawing Sheets

COMPACT DUAL-CHANNEL TRANSCEIVERS

NOTICE OF GOVERNMENT-SPONSORED RESEARCH

This invention was made with Government support under grant contract numbers 0925929 and 1232183 awarded by the National Science Foundation (NSF). The Government has certain rights in the invention.

BACKGROUND

Our society is increasingly dependent upon larger and more complex networks of civil infrastructure that are costly to maintain. These infrastructures, especially those for transportation, are deteriorating due to factors such as corrosion of the steel reinforcement and high continuous vibration. This type of degradation has motivated research activity on distributed wireless sensors that enable low-cost, near continuous, and near real-time, non-destructive monitoring.

In order to efficiently provide such monitoring capabilities, it is preferred to have the sensor node embedded within the structure in direct proximity of the physical or chemical activity of interest. Embedding the sensor node requires the device to be passive or recharged externally to extend the lifetime because of the difficult accessibility, and to have a compact geometry to avoid compromising the structural integrity and to facilitate the deployment of the node into the preferred location. In order to communicate with embedded sensor nodes over a long distance and from a convenient location, the sensing device should require low radio frequency (RF) activation power and be energy efficient.

Another challenge associated with passive embedded wireless monitoring is remote channel calibration. When the sensor node is deployed in a structure, it is of concern to periodically calibrate the propagation channel (between the interrogator and the node) to obtain a proper reading from the sensor and confirm that the node is functioning properly. Although such calibration can be obtained by placing a reference node in close proximity to the sensor node, the requirement for an additional node to be placed close to each sensing node is undesirable.

From the above discussion, it can be appreciated that it would be desirable to have alternative apparatus that enables remote channel calibration of an embedded sensor node.

BRIEF DESCRIPTION OF THE DRAWINGS

The present disclosure may be better understood with reference to the following figures. Matching reference numerals designate corresponding parts throughout the figures, which are not necessarily drawn to scale.

DETAILED DESCRIPTION

As described above, it would be desirable to have apparatus that enables remote channel calibration of an embedded sensor node. Disclosed herein is a sensor node that has integrated means for calibrating the node. In some embodiments, the sensor node comprises a compact three-dimensional dual-channel transceiver that includes separate harmonic repeaters for sensing and providing a reference signal so as to enable remote calibration and identification. In some embodiments, each repeater comprises separate receive and transmit antennas that are coupled to a frequency multiplier that multiplies the frequency of an interrogation signal that is received by the receive antenna. The sensing repeater is coupled to a sensor that modulates the interrogation signal so that a response signal is reflected back to the interrogation device that is indicative of a sensed parameter (e.g., temperature, vibration, etc.).

In the following disclosure, various specific embodiments are described. It is to be understood that those embodiments are example implementations of the disclosed inventions and that alternative embodiments are possible. All such embodiments are intended to fall within the scope of this disclosure.

Figure 1:
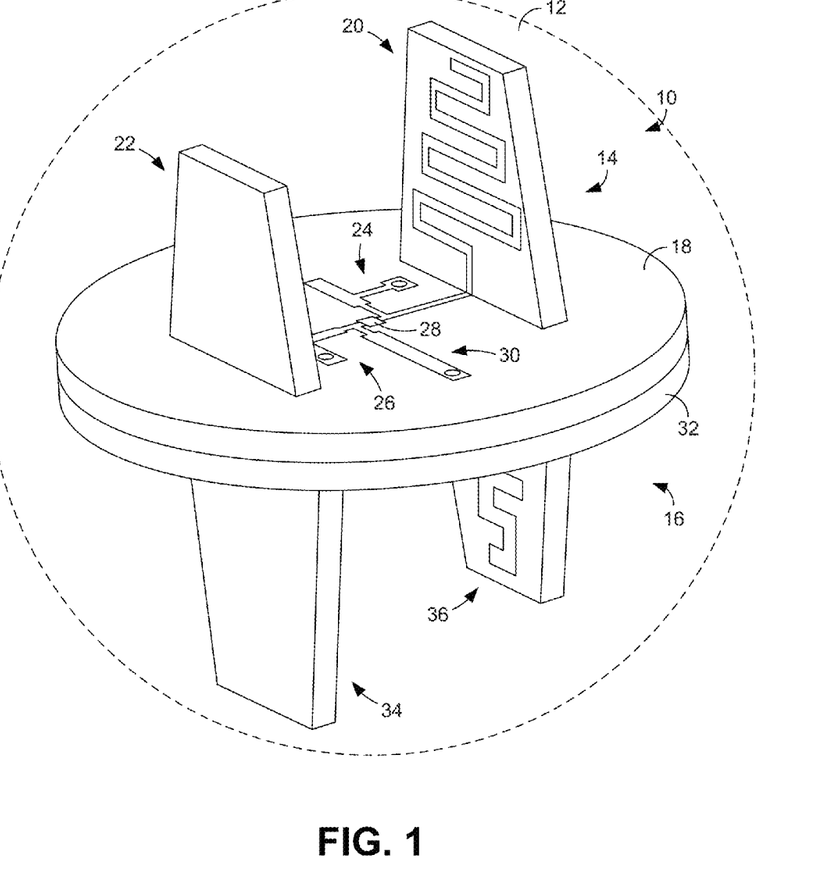
FIG. 1 is a perspective view of an embodiment of a compact dual-channel transceiver for use in embedded sensing applications.

FIG. 1 illustrates an embodiment of a compact three-dimensional dual-channel transceiver 10. In some embodiments, the transceiver 10 is configured to fit within the volume of a sphere 12 having a diameter of approximately 1.5 to 4 cm (e.g., 3 cm). As shown in FIG. 1, the transceiver 10 generally comprises a first harmonic repeater 14, which can be used for sensing (i.e., a sensing repeater), and second harmonic repeater 16, which can be used to provide a reference signal (i.e., a reference repeater). The first repeater 14 comprises a base substrate 18 as well as first and second antenna supports 20 and 22 that extend upward (vertically) from the base substrate. In some embodiments, the supports 20, 22 are substrates having the same construction as the base substrate 18 and lie in planes that are orthogonal to the plane in which the base substrate lies. By way of example, the substrates can be constructed of Rogers/RT Duroid 6006 material and have a nominal relative dielectric constant (Er) of 6.5 and a thickness of 50 mils (1.27 mm). As described below, each support 20, 22 supports an antenna of the repeater 14.

As is further indicated in FIG. 1, formed on the base substrate 18 are first and second feeding networks 24 and 26 that are coupled to the antennas formed on the antenna supports 20, 22, respectively. Joining the feeding networks 24, 26 is a frequency multiplier 28, that multiplies the frequency of an input signal, such as a received interrogation signal. In some embodiments, the frequency multiplier 28 comprises a GaAs Schottky diode (e.g., Agilent HSCH-9161) that doubles the frequency of the input signal. In such cases, the frequency multiplier 28 can be referred to as a frequency doubler. As is also shown in FIG. 1, also formed on the base substrate 18 is a direct current (DC) bias network 30 that is coupled to the second feeding network 26.

The second repeater 16 is similar in configuration to the first repeater 14. Accordingly, the second repeater 16 generally comprises a base substrate 32 as well as first and second antenna supports 34 and 36 that extend upward (vertically) from the base substrate (see FIG. 5A). In some embodiments, the supports 34, 36 are substrates having the same construction as the base substrate 32 and lie in planes that are orthogonal to the plane in which the base substrate lies. By way of example, the substrates can be constructed of Rogers/RT Duroid 6006 material and have a nominal relative dielectric constant (Er) of 6.5 and a thickness of 50 mils (1.27 mm). Irrespective of their construction, each support 34, 36 supports an antenna of the repeater 16.

As is further shown in FIG. 1, the first repeater 14 and the second repeater 16 are physically connected together to form an integrated device. As indicated in the figure, the base substrates 18, 32 can be connected to each other so that the first and second repeaters 14, 16 have an inverted orientation relative to each other. In the orientation shown in FIG. 1, the antenna supports 20, 22 extend in an upward direction and the antenna supports 34, 36 extend in an opposite, downward direction.

Figure 2A:
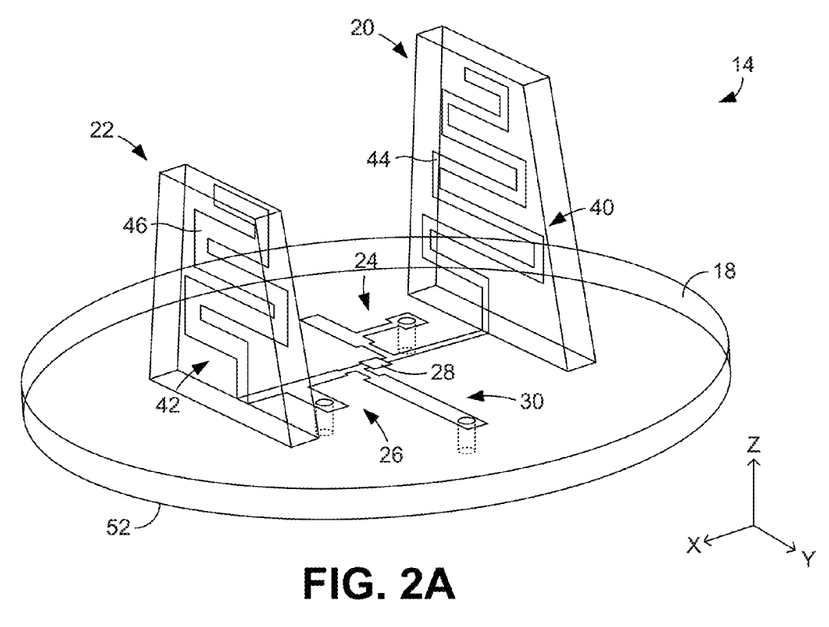
FIG. 2A is a perspective view of a first (sensing) repeater of the transceiver of FIG. 1.
Figure 2B:
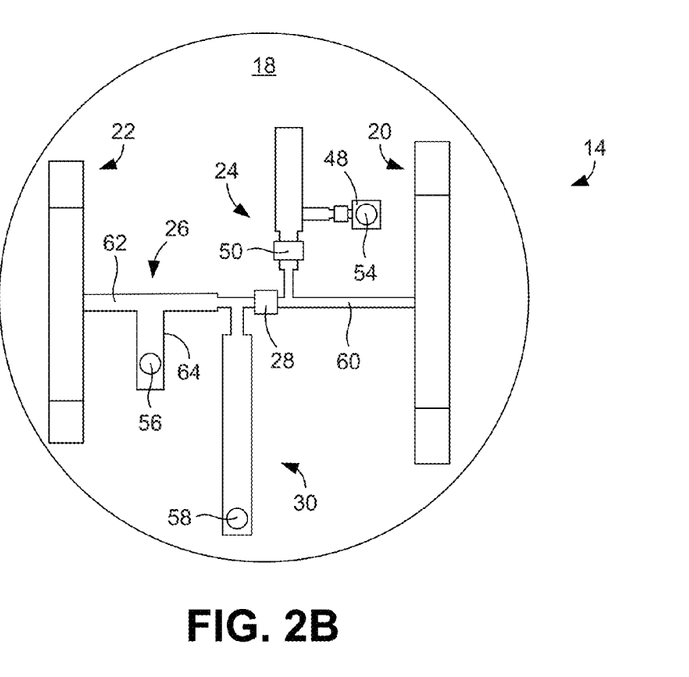
FIG. 2B is a plan view of the first repeater of FIG. 2A.

FIGS. 2A and 2B show the first (sensing) repeater 14 in greater detail. More particularly, FIG. 2A shows the repeater 14 in a perspective view and FIG. 2B shows the repeater in a top (plan) view. As is apparent from FIG. 2A, each antenna support 20, 22 is generally triangular in shape and therefore has a relatively wide base that narrows in the direction away from the base substrate 18 because of angled edges of the support. In the illustrated embodiment, the first antenna support 20 is larger than the second antenna support 22. By way of example, the first antenna support 20 can be approximately 12 mm tall and its distal tip can be approximately 8 mm wide, while the second antenna support 22 can be approximately 10 mm tall and its distal tip can be approximately 7 mm wide.

Each antenna support 20, 22 comprises an inner side upon which an antenna is formed. Specifically, a receive antenna 40 is formed on the inner side of the first antenna support 20 and a transmit antenna 42 is formed on the inner side of the second antenna support 22. In the illustrated embodiment, each antenna comprises a meandered monopole antenna including a meandered conductor trace 44 and 46 that is wider near the base (near the base substrate 18) and narrower near the tip (away from the base substrate).

FIG. 2B shows the feeding networks 24 and 26 of the first repeater 14 more clearly. As indicated in this figure, the first feeding network 24 comprises a bias network that includes a bypass capacitor 48 and an RF choke 50. Extending downward through the base substrate 18 to a ground plane 52 formed on the bottom of the base substrate 18 (FIG. 2A) is a via 54. The second feeding network 26 also comprises a via 56 that extends downward through the base substrate 18 to the ground plane 52. In addition, the second feeding network 26 comprises a shunt-shorted stub 64 that includes a via 56 that extends downward through the base substrate 18 to the ground plane 52.

In some embodiments, the first repeater 14 operates by receiving a signal at an $f_1$ of 2.4 GHz and transmitting a return signal at $2 \cdot f_1$ of 4.8 GHz. With further reference to FIG. 2B, the receive antenna 40 is fed by a microstrip line 60 that can have a characteristic impedance ($Z_o$) of 76Ω and electrical length of $\lambda_g/16$. The transmit antenna 42 is fed by a microstrip line 62 that can have a length of $\lambda_g/13$ and $Z_o$ of 74Ω and a $\lambda_g/20$ shunt-shorted stub 64 that can have a $Z_o$ of 63Ω. The bias network 30 is added to provide an interface with the embedded sensor (not shown), as is discussed below. By way of example, the bias network 30 can comprise a 27 nH series inductor (Coilcraft 0402) and 8.2 pF shunt capacitor (Johanson 0201).

Figure 3A:
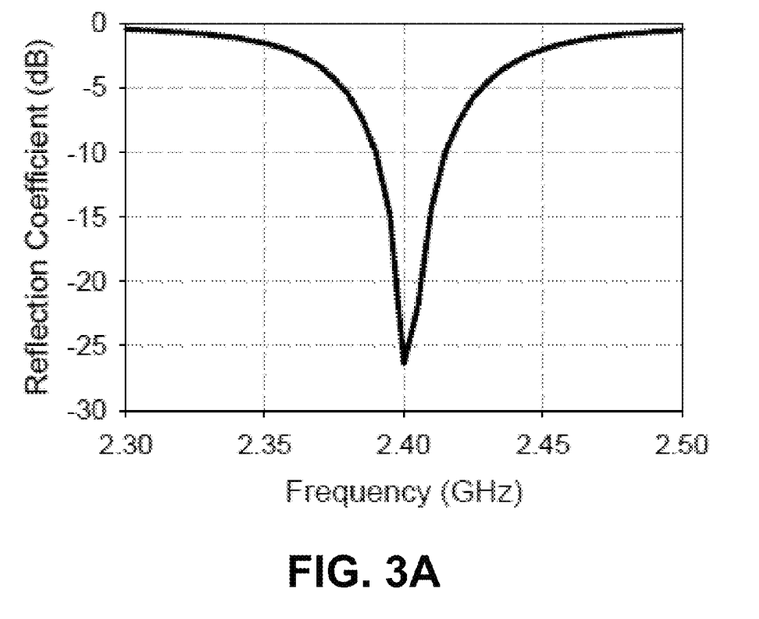
FIGS. 3A and 3B are graphs that show (A) the simulated reflection coefficient between a receive antenna and a multiplier input and (B) between a transmit antenna and a multiplier output of the sensing repeater at −30 dBm input power and 0 V bias.
Figure 3B:
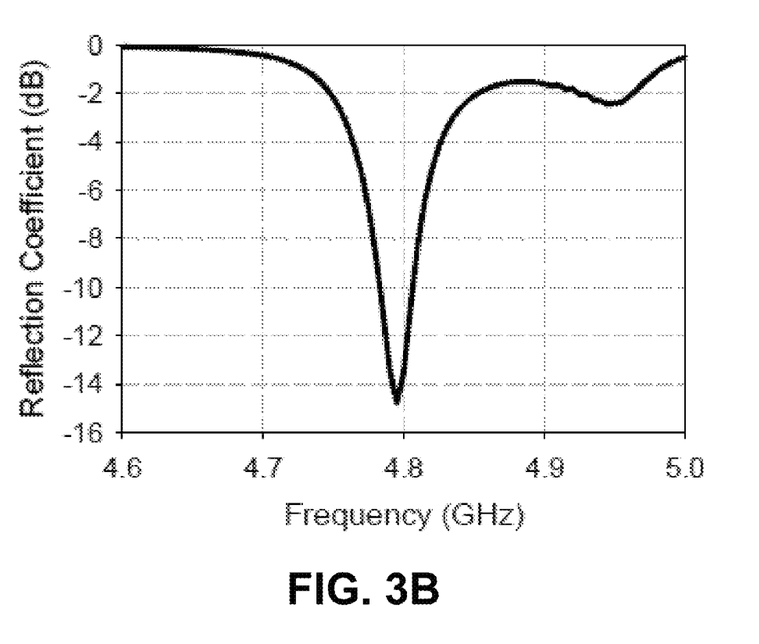

An Advanced Design System (ADS) 2009u1 schematic was used to simulate the frequency multiplier 28 and find the optimum impedances that the antennas 40, 42 need to present to the multiplier input/output to provide the best conversion gain (CG) at −30 dBm input power. The CG is defined herein as the ratio of the return power at 4.8 GHz to the received power at 2.4 GHz. Based on the simulation, it was found that the receive antenna 40 needs to present an impedance of 93+j358Ω at 2.4 GHz and the transmit antenna 42 needs to present an impedance of 25+j200Ω at 4.8 GHz. To provide these impedances, the High Frequency Structure Simulator (HFSS) 14 was used to optimize parameters such as the number of the monopole meandered sections, width of the sections, spacing of the sections, and the feeding network parameters. The complete transceiver configuration shown in FIG. 1 was used for these simulations. A $\lambda_g/10$ 64 Ω shunt-shorted stub 30 was added to the multiplier circuit to fine tune the impedance match. This short-shorted stub 30 also provides a DC path for the diode return current. FIGS. 3A and 3B show the reflection coefficient between the receive antenna 40 and the multiplier input, and the transmit antenna 42 and the multiplier output, respectively, at −30 dBm input power. As shown in those figures, the reflected power at the fundamental frequency is very low.

One of the antenna design goals was to minimize size without significantly degrading the H-plane gain variation (the omni-directional pattern) to facilitate interrogation. This was achieved by minimizing the size of the antenna supports 20, 22 supporting the antennas 40, 42 to reduce edge diffraction and by reducing the coupling between the antennas. The coupling was reduced by optimizing (1) the size of the ground plane 52, (2) the distance between the antennas 40, 42, and (3) the height of the antennas. In addition, the meander pattern of the antenna traces 44, 46 and the location of each antenna 40, 42 significantly contribute to the coupling. As shown in FIG. 1, the receive and transmit antennas 40, 42 are positioned at opposite ends of the base substrate 18 and the meandering directions were chosen so that the induced near-field currents on each parasitic antenna oppose the current direction on each driven antenna, thus self-canceling unwanted radiated far-fields. Reducing the coupling provides the additional benefit of having the reference signal independent of the modulated return signal.

Figure 4A:
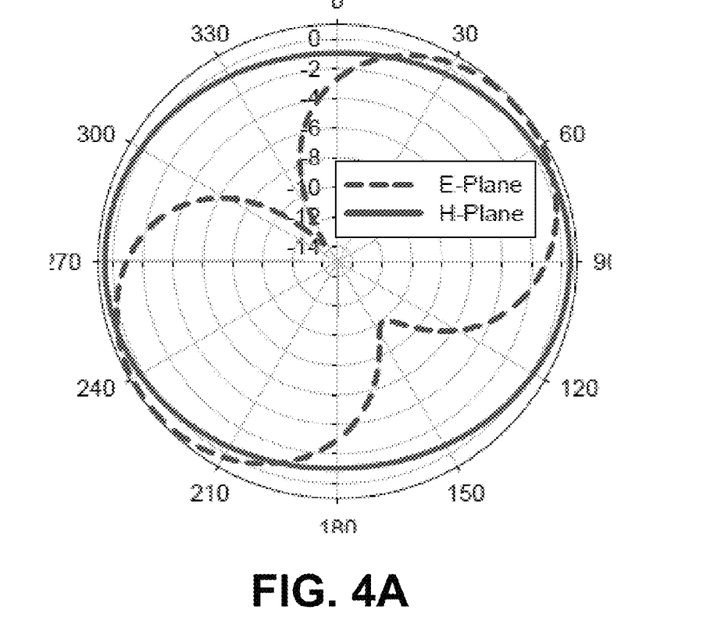
FIGS. 4A and 4B are the simulated E- and H-plane radiation patterns of (A) the receive antenna at 2.4 GHz and (B) the transmit antenna at 4.8 GHz.
Figure 4B:
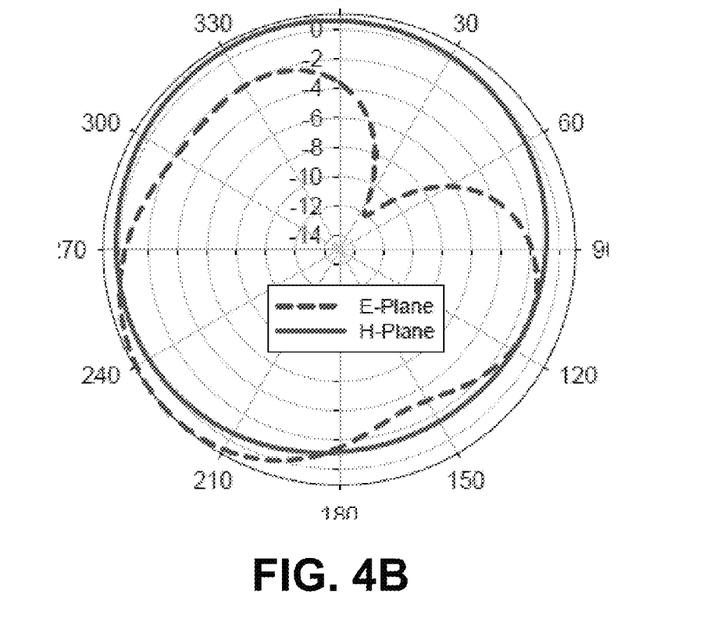

FIGS. 4A and 4B show the simulated radiation patterns of the receive and transmit antennas 40, 42 at 2.4 GHz and 4.8 GHz, respectively. The antennas 40, 42 are linearly polarized along the Z-axis relative to the coordinate system shown in FIG. 2A. As shown in FIGS. 4A and 4B, the antennas 40, 42 demonstrate omni-directional patterns in the XY plane. The gain variation over the receive antenna H-plane is 1.6 dB, while it is 2 dB for the transmit antenna 42. The receive antenna peak gain is 0.9 dB with a simulated radiation efficiency of 78.5%. The peak gain and radiation efficiency of the transmit antenna 42 are 1.1 dB and 67%, respectively. The distortion shown in the pattern, especially the E-plane, is due to (1) the relatively small ground plane size, (2) coupling from the other antennas, and (3) operating the antenna off resonance. For the same reasons, the radiation efficiency and gain were degraded.

Figure 5A:
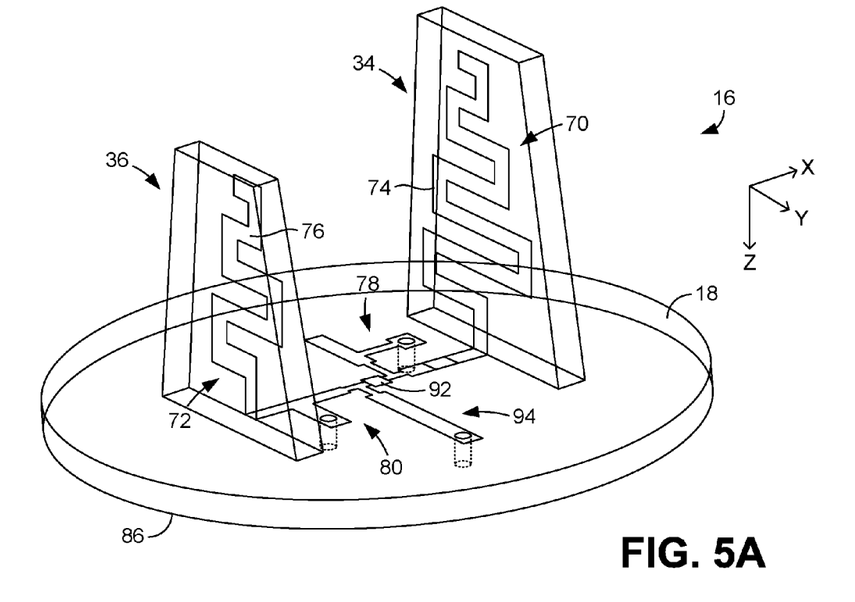
FIG. 5A is a perspective view of a second (reference) repeater of the transceiver of FIG. 1.
Figure 5B:
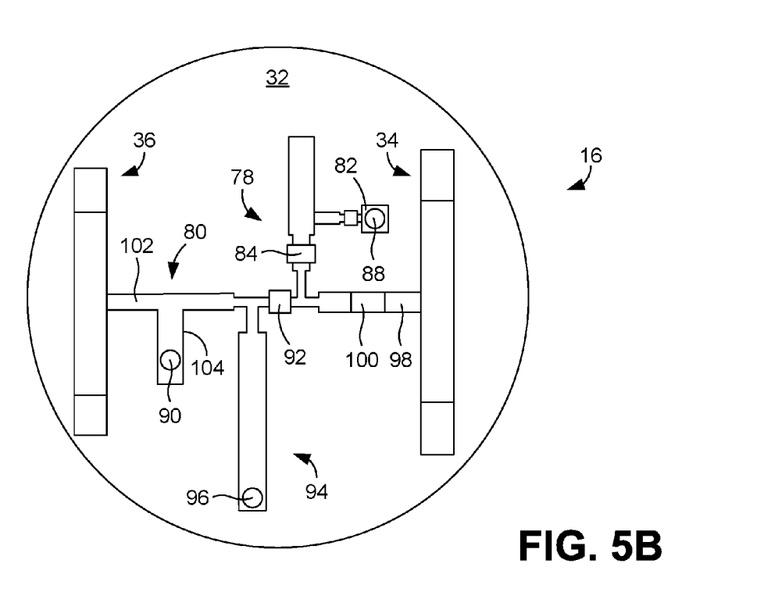
FIG. 5B is a plan view of the second repeater of FIG. 5A.

FIGS. 5A and 5B show the second (reference) repeater 16 in greater detail. More particularly, FIG. 5A shows the repeater 16 in a perspective view and FIG. 5B shows the repeater in a top (plan) view. As is apparent from FIG. 5A, each antenna support 34, 36 is generally triangular in shape and therefore has a relatively wide base that narrows in the direction away from the base substrate 32 because of angled edges of the support. In the illustrated embodiment, the first antenna support 34 is larger than the second antenna support 36. By way of example, the first antenna support 34 can be approximately 14 mm tall and its distal tip can be approximately 8 mm wide, while the second antenna support 22 can be approximately 11 mm tall and its distal tip can be approximately 7 mm wide.

Each antenna support 34, 36 comprises an inner side upon which an antenna is formed. Specifically, a receive antenna 70 is formed on the inner side of the first antenna support 34 and a transmit antenna 72 is formed on the inner side of the second antenna support 36. In the illustrated embodiment, each antenna 70, 72 comprises a meandered monopole antenna including a meandered conductor trace 74 and 76 that is wider near the base (near the base substrate 32) and narrower near the tip (away from the base substrate).

FIG. 5B shows feeding networks 78 and 80 that are coupled to the first and second antennas 70, 72, respectively. As indicated in this figure, the first feeding network 78 comprises a bias network that includes a bypass capacitor 82 and an RF choke 84. Extending downward through the base substrate 18 to a ground plane 86 formed on the bottom of the base substrate 32 (FIG. 5A) is a via 88. The second feeding network 80 also comprises a via 90 that extends downward through the base substrate 32 to the ground plane 86. Joining the feeding networks 78, 80 is a frequency multiplier 92, that multiplies the frequency of an input signal. In some embodiments, the frequency multiplier 92 comprises a GaAs Schottky diode (e.g., Agilent HSCH-9161) that doubles the frequency of the input signal. As is also shown in FIG. 5B, the second feeding network 80 comprises a shunt-shorted stub 104 that includes a via 90 that extends down to the ground plane 86.

In some embodiments, the second repeater 16 is designed to receive a signal at an $f_1$ of 2.75 GHz and transmit a signal back at $2 \cdot f_1$ of 5.5 GHz. Based on simulated data, the frequency separation between the first (sensing) repeater 14 and the second (reference) repeater 16 can be reduced to 200 MHz at the fundamental frequency without a significant increase in the coupling between the antennas. If smaller frequency spacing is required, the distance between the antennas and the ground plane size can be increased. The receive antenna 70 is fed by a $\lambda_g/14$ 69 Ω microstrip line 98 and a 3.9 nH series inductor 100 (e.g., Coilcraft 0402). The transmit antenna 76 is fed by a $\lambda_g$ Ill 69 Ω microstrip line 102 and a $\lambda_g/18$ shunt-shorted stub 104 with a $Z_o$ of 64Ω. Similar to the multiplier circuit of the first repeater 14, an additional shunt-shorted stub 94 of an electrical length of $\lambda_g/9$ and Zo of 64 Ω was added to fine tune the impedance match. In the case of the second repeater 16, the bias network is included in the design for measurement purposes only.

Based on the ADS simulation, it was found that the receive and transmit antennas 70, 72 should present an impedance of 67+j250Ω at 2.75 GHz and an impedance of 30+j160Ω at 5.5 GHz, respectively. The reference repeater reflection coefficients between the antennas 70, 72 and multiplier circuit, as well as the radiation patterns, are similar to those of the first repeater 14. The variation over the receive antenna H-plane is 1 dB, while it is 0.8 dB for the transmit antenna 72. The receive antenna peak gain is 1.8 dB with a simulated radiation efficiency of 94.5%. The peak gain and radiation efficiency of the transmit antenna 72 are 2 dB and 98%, respectively. The antennas 70, 72 have better gain and efficiency performance than those of the first repeater 14 because of the relative increase in the occupied electrical size.

Figure 6A:
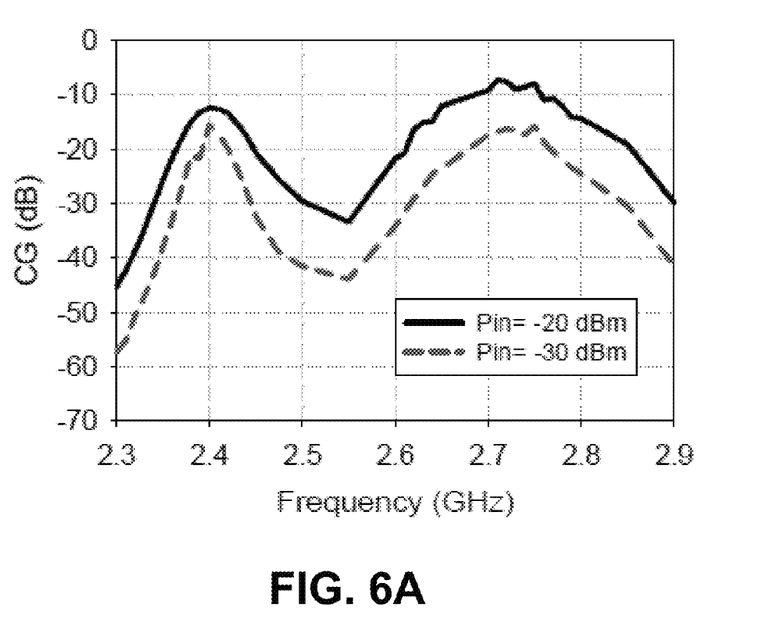
FIGS. 6A and 6B are graphs that show (A) the measured conversion gain (CG) of a dual-channel transceiver versus frequency for different received powers and (B) the simulated and measured CG versus received power at an $f_1$ of 2.4 GHz and 2.75 GHz.
Figure 6B:
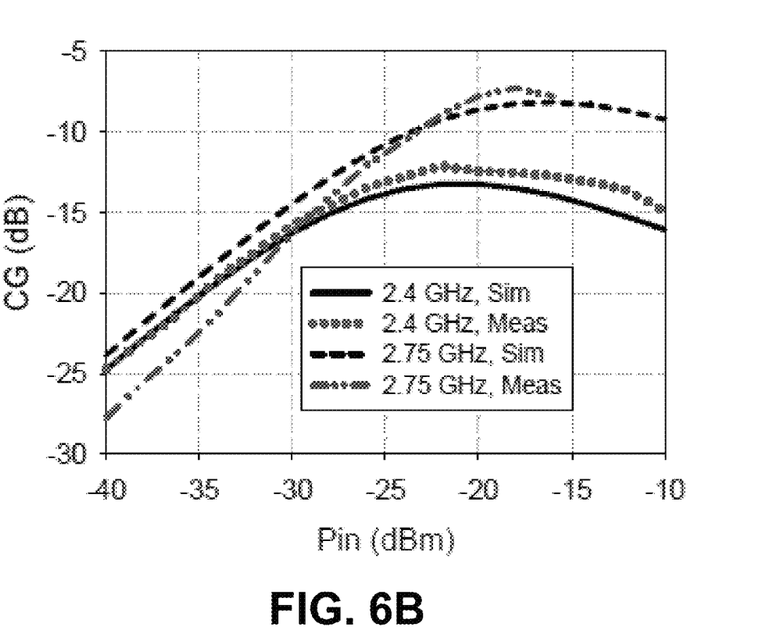

The performance of the transceiver design described above was characterized inside an anechoic chamber. The measurements were performed by transmitting a signal at an $f_1$, which was generated by a vector network analyzer (VNA), and measuring the return signal at $2 \cdot f_1$ using a spectrum analyzer. The transmit and receive interrogator antennas were placed at a distance of 1 m from the transceiver under test and separated by 1.5 m. Low-pass filters were used in the transmit side to filter out the VNA-generated harmonics. FIGS. 6A and 6B show the measured and simulated CG performance for different input power levels and $f_1$. The simulated CG of the entire repeater was calculated by adding the sum of antenna gains to the simulated CG curve of the multiplier alone. For an input power of −30 dBm, the CG maxima are −15.5 dB at an $f_1$ of 2.4 GHz, and −15.7 dB at an $f_1$ of 2.75 GHz. The 3 dB CG bandwidth is 2% and 1.25% at $f_1$ of 2.4 GHz and input powers of −20 dBm and −30 dBm, respectively. At an $f_1$ of 2.75 GHz, the 3 dB CG bandwidth is ~2.5% for input powers of −20 dBm and −30 dBm. As shown in FIG. 6B, the measured CG versus received power at an $f_1$ of 2.4 GHz is well matched with the simulated curve while there is a difference between the measured and simulated curves at an $f_1$ of 2.75 GHz at low power. This difference can be attributed to fabrication and assembly errors.

Figure 7A:
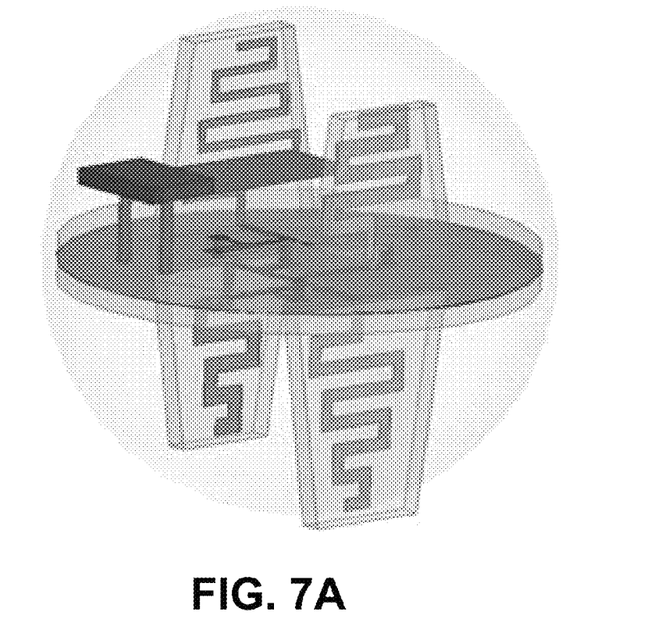
FIG. 7A is a perspective view of a dual-channel transceiver similar to that of FIG. 1, shown connected to a sensor.
Figure 7B:
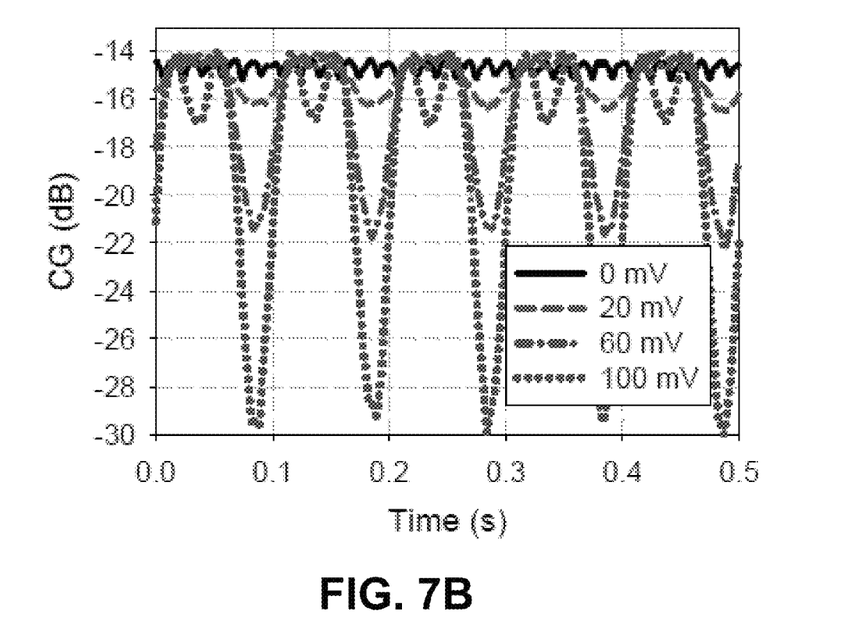
FIG. 7B is a graph that shows the measured CG versus time for modulation signals of frequency of 10 Hz and different amplitudes at an $f_1$ of 2.4 GHz and received power of −30 dBm for the transceiver shown in FIG. 7A.

Integration of a sensor into the transceiver node was also studied. In order to illustrate the ability to modulate the return signal, a function generator was used to apply a sinusoidal 10 Hz signal at the frequency doubler input through the bias network and the power level of the return signal was measured versus time (FIG. 7B). This applied AC waveform represents the signal that would be provided by a sensor. This measurement was performed for an RF input power level of −30 dBm. As shown in FIG. 7B, when the amplitude of the AC signal is set to 0 V, the return signal level is constant. By applying a low-level signal (20 mV), an amplitude modulated return signal can be detected. Increasing the amplitude of the AC signal increases the variation of the return signal level. In order to determine the sensitivity of the transceiver to housing a sensor within the structure, full-wave simulations were performed that included a physical model for a commercial piezo thin film vibration sensor (MiniSense 100NM from Measurement Specialties) as shown in FIG. 7A. The presence of the sensor causes a frequency shift of 10 MHz and 1% reduction in the radiation efficiency of the receive antenna and 1 dB increase in the gain variation over the transmit antenna H-plane. This degradation can be mitigated by re-optimizing the design while the sensor is included.

Table I shows a comparison of the maximum CG, operating power, and electrical size (ka) of the presented transceiver design and other single-channel harmonic repeater tags from the prior art. Ka represents the size of the overall structure, where $k=2\pi/\lambda$, $\lambda$=free space wavelength at $f_1$ and a=radius of the smallest sphere enclosing the maximum dimension of the tag. As shown in Table I, although the proposed design contains integrated two repeaters, the CG performance and overall electrical occupied volume compare well with the compact, most efficient single channel designs. In addition, the proposed dual-channel transceiver provides omnidirectional interrogation capability which facilitates the deployment of the node and the interrogation. The expected communication at $f_1$ of 2.4 GHz range using an interrogator with an effective isotropic radiated power (EIRP) of 2 W and 15 dBi gain antenna on the receive side is 45 m in free space.

TABLE I

Comparison Of The CG And Electrical Size With Others From Literature

| Parameter | Max CG (dB) | RF Power (dBm) | ka | $f_1$ (GHz) |
|---|---|---|---|---|
| Presented Design | −7.2 | −18 | 0.78 | 2.4 |
| [13] | −8.4 | −20 | 0.75 | 2.4 |
| [9] | −19.7 | −15 | 0.78 | 1.3 |
| [10] | −35.4 | −19.5 | 076 | 1.3 |
| [11] | −11 | −41 | 0.83 | 5.9 |

Calibration of the propagation channel becomes a practical challenge for the implementation of a long-range passive embedded monitoring system. Such calibration is required when the exact characteristics of the interrogator-node link are unknown or vary with time. When the signal that is returned from the sensing repeater slowly changes over time, as would occur for a temperature sensor, the reference repeater can be used to provide a constant signal level to compare with the sensor activity. For the sensors that provide a relatively high-frequency modulated return signal, the reference signal can be used to ensure that the node is operable and to determine the location of the node. For both of these scenarios, the reference signal can also be used to identify the node.

Figure 8A:
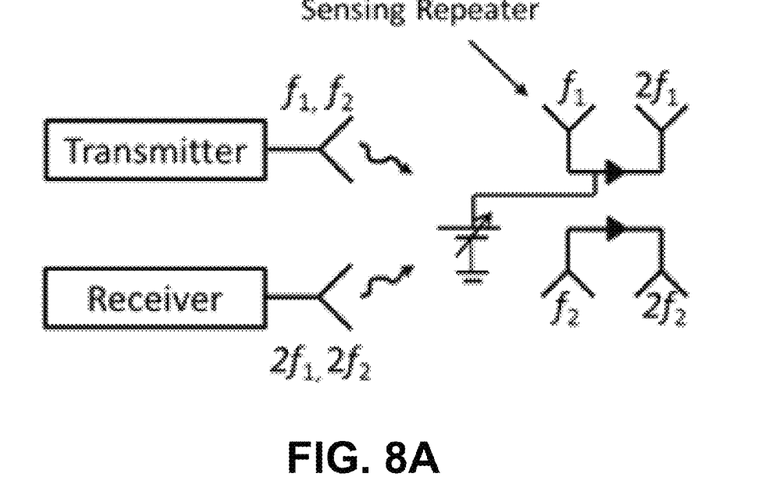
FIG. 8A illustrates a calibration measurement setup that was used for evaluation of a dual-channel transceiver.
Figure 8B:
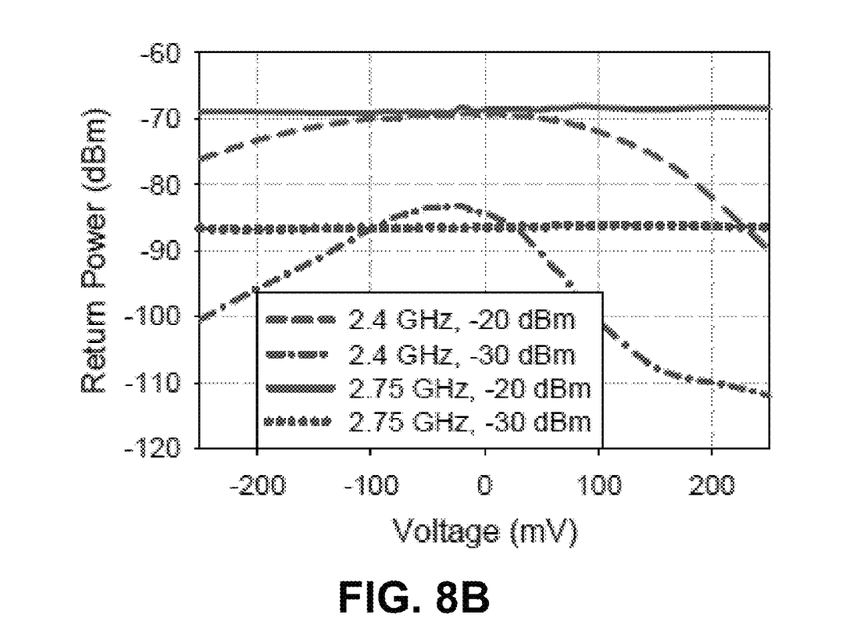
FIG. 8B is a graph that shows the measured return power for different values of $f_1$ versus bias voltage applied to the sensing repeater at −30 dBm input power for the setup of FIG. 8A.

FIG. 8B illustrates the measured return power level at an $f_1$ of 2.4 GHz and an $f_1$ of 2.75 GHz for different applied bias voltage to the sensing repeater and different received power. This measurement was performed as illustrated in FIG. 8A. As shown in FIG. 8B, when interrogating the transceiver with a signal frequency of 2.75 GHz, the reference repeater provides a nearly constant return signal at $2 \cdot f_1$ of 5.5 GHz that is unaffected by the bias on the sensing repeater. The variation of the 5.5 GHz signal amplitude is only +/−0.5 dB and +/−0.3 dB for RF input power of −20 and −30 dBm, respectively. Conversely, interrogating the transceiver with a signal frequency $f_1$ of 2.4 GHz provides a return signal at $2 \cdot f_1$ of 4.8 GHz that is highly sensitive to the applied DC voltage; 0.1 V bias decreases the return signal by >16 dB. By subtracting the amplitude of the 5.5 GHz return signal from the 4.8 GHz return signal, the modulated return signal can be corrected for channel effects, in practice providing a calibrated sensor reading. This difference between the return signal from the reference and sensing repeaters is referred to as $\Delta P_r$.

Figure 9A:
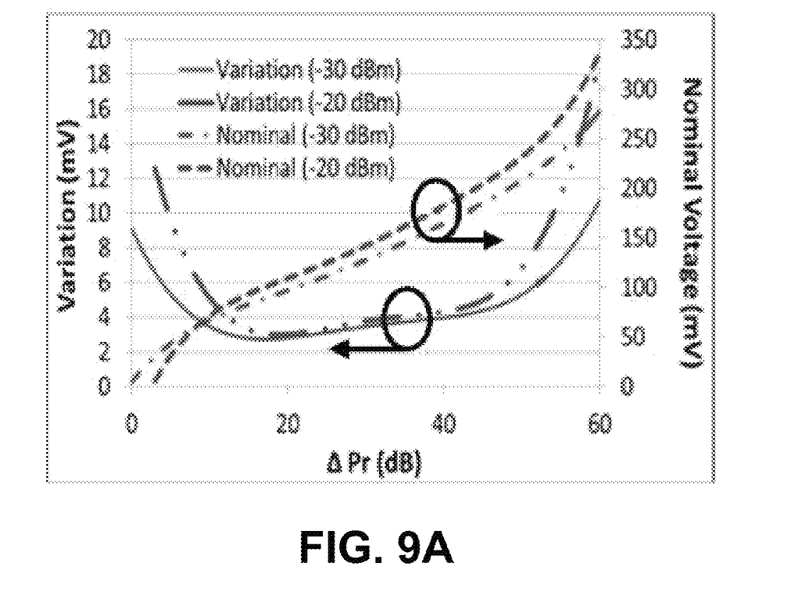
FIGS. 9A and 9B are graphs that show (A) the variation in extracted sensor voltage versus $\Delta P_r$ for different received power due to angle of incidence uncertainty and (B) $\delta P_r$ for different azimuth angle and received power at 0 V bias.
Figure 9B:
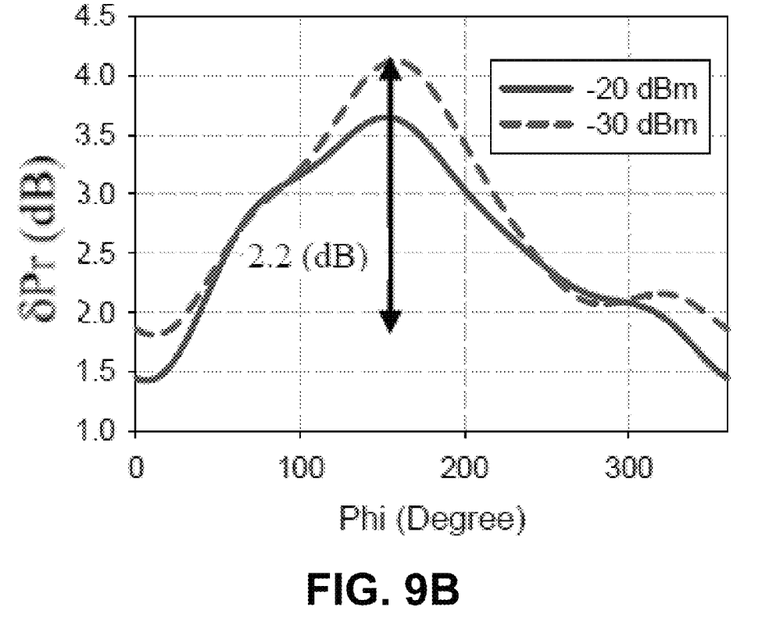

Because the H-plane radiation patterns at the sensing and reference repeater frequencies have a gain difference that changes versus angle, the calibrated sensor reading can have uncertainty. That is, in addition to the sensor activity, $\Delta P_r$ will vary depending on the angle of incidence ($\phi$) of the interrogation signal, which may not be known to high accuracy. Based on the simulated radiation patterns, the maximum $\Delta P_r$ variation ($\delta P_r$) at 0 V bias versus angle is found to be ~2.2 dB for RF input power of −20 dBm and −30 dBm (FIG. 9B). Using the data in FIG. 8B, $\Delta P_r$ can be superimposed on $\Delta P_r$ to determine the corresponding variation that would be found in the extracted value of the sensor-provided voltage (FIG. 9A). For sensors that generate voltage between 60-200 mV, the maximum voltage variation is 5 mV and 6.5 mV for RF input power of −30 dBm and −20 dBm, respectively. This variation assumes that the angle of incidence may vary between 0° and 360°, however, in an actual application the angular uncertainty may be much less than 45°. For simplification, it was assumed in this assessment that the sensor provides only positive voltages.

A method for identifying individual nodes, when no or very limited signal processing is possible at the node, was also investigated. Different approaches can be used to address this challenge, such as introducing time or phase delay between the nodes or through frequency diversity. Due to potentially severe multi-path propagation environments, however, the frequency diversity method is more viable for embedded sensing. With the disclosed dual-channel transceiver, identification can be performed if a unique design frequency is chosen for the reference repeater of each node. In operation, the interrogation frequency can be swept until the return signal peaks and the node is identified. Given the narrowband characteristics of the nodes, the identification signal from the interrogator is easily isolated from the sensor activity. Furthermore, both the reference and sensing repeater frequencies can be selectable, which squares the number of unique node identifications (IDs). The use of high Q filters to further reduce the CG bandwidth of the repeater would noticeably degrade the CG efficiency.

One approach that can further increase the ID count without affecting performance is to combine polarization and frequency diversity. The antennas used in the transceiver are linearly polarized and, when deployed, adjacent nodes can be oriented to have a given amount of polarization mismatch. A conservative estimate is that 5 dB of mismatch would be sufficient to distinguish between adjacent nodes. Due to the non-linear CG versus power slope, the measured co-pol to cross-pol ratio was found to be at least 40 dB. Therefore, polarization diversity can increase the number of IDs by a factor of 8.

Table II provides the expected number of IDs assuming the interrogator operating bandwidth is 2-3 GHz and the amplitude isolation between the nodes is required to be 5 dB. As shown in the table, by changing the node polarization and the reference repeater frequency, the number of nodes is 48 and 56 for RF power levels of −20 dBm and −30 dBm received at the node, respectively. These numbers are calculated using the interrogator bandwidth divided by the repeater bandwidth (both in MHz) multiplied by 8 for the polarization diversity factor. Cases with <200 MHz separation between the sensing and reference frequencies were excluded. Changing both the reference and sensing repeater operating frequencies and the polarization will increase the number of IDs to 768 and 2112 for RF power levels of −20 dBm and −30 dBm, respectively. Employing frequency diversity to both channels has the additional significant benefit of allowing different nodes located within the interrogator beam angle to be identified, thus overcoming the limitations on the distance between the deployed nodes, interrogation distance, and interrogator antenna design (directivity, beam width and size).

TABLE II

Number Of Node IDs Using A 2-3 GHz Interrogator For Different RF Power Levels (With Polarization Diversity)

|  | −20 dBm | −30 dBm |
|---|---|---|
| 5 dB CG BW (sensing repeater) | 5% | 3.2% |
| 5 dB CG BW (reference repeater) | 3% | 1.6% |
| Min no. of nodes, changing reference repeater frequency | 48 | 56 |
| Min no. of nodes, changing sensing and reference repeater frequency | 768 | 2112 |

Figure 10A:
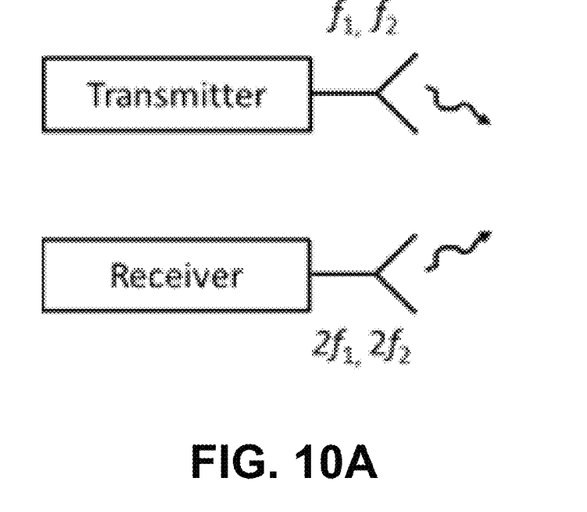
FIGS. 10A and 10B illustrate an embedded sensor experimental setup.
Figure 10B:
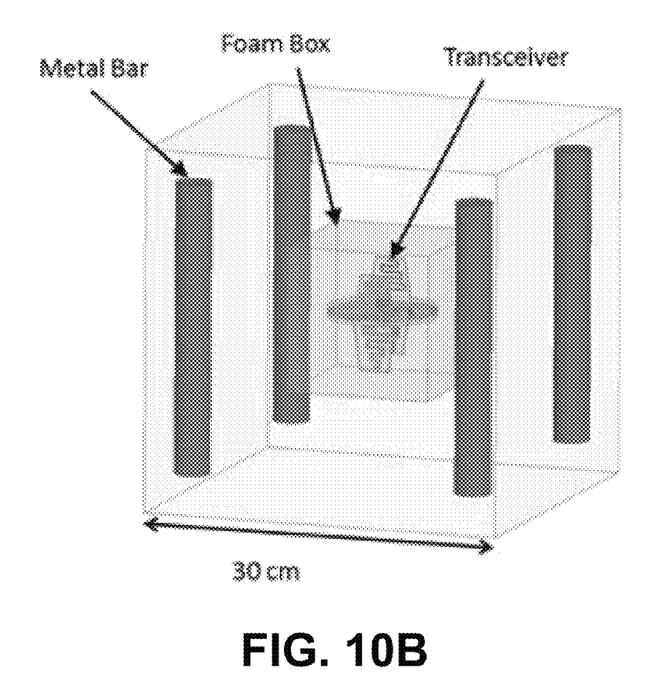

A preliminary study of the impact of embedding the proposed transceiver was also performed. FIGS. 10A and 10B illustrate the experimental setup that was used. The transceiver is buried in the middle of a box which was filled with dry sand and has four cylindrical metal bars. The metal bars were inserted to better represent a structure with rebar enforcement. The side dimension of the sand box was 30 cm and the bars had a diameter of 1 cm and height of 20 cm. To protect the transceiver from damage and to reduce the effect of the sand direct dielectric loading, the transceiver was placed inside a 5×5×5 cm$^3$ foam box (electrical properties similar to air). During the measurement, the transceiver was oriented to achieve the maximum CG. The CG maxima occurred at shifted $f_1$ frequencies of 2.39 GHz and 2.72 GHz with similar bandwidths to what was measured in air. The frequency shifts can be corrected for by optimizing the design to operate in a sand environment. The embedding also caused degradation in the CG by 1 dB (at 2.39 GHz) and 6 dB (at 2.72 GHz) for −20 dBm input power. The degradation was approximately 2 dB higher at each frequency for −30 dBm input power. This degradation was due to attenuation through the sand layer and the frequency shift that cause differences in the impedance match conditions. For these reasons the degradation at 2.72 GHz is much higher. In addition, the embedding experiment illustrated a decrease in the co-pol to cross-pol isolation by 8 dB. This decrease was due to signal diffraction at the air/sand interfaces and multi-path reflections of the experiment setup.

The effect of the surrounding medium on the frequency of the CG maxima and the polarization of the return signal will cause uncertainty in the node ID and will require the frequency spacing and polarization mismatch level between the IDs to be larger. For certain sensing environments in which the multi-path and interference levels are high, difficulties in the proposed remote channel calibration approach will also be introduced.

The invention claimed is:
1. A dual-channel transceiver comprising:
   a first harmonic repeater comprising a base substrate, a first antenna support extending outward from the base substrate, a second antenna support extending outward from the base substrate, a receive antenna formed on the first antenna support, a transmit antenna formed on the second antenna support, and a frequency multiplier formed on the base substrate and connected to the antennas that is configured to increase the frequency of a signal received by the receive antenna to enable transmission by the transmit antenna of a response signal having a higher frequency; and
   a second harmonic repeater connected to the first harmonic repeater, the second harmonic repeater comprising a base substrate, a first antenna support extending outward from the base substrate, a second antenna support extending outward from the base substrate, a receive antenna formed on the first antenna support, a transmit antenna formed on the second antenna support, and a frequency multiplier formed on the base substrate and connected to the antennas that is configured to increase the frequency of a signal received by the receive antenna to enable transmission by the transmit antenna of a response signal having a higher frequency;
   wherein the base substrates are connected together in a manner in which the antenna supports of the first harmonic repeater extend in a direction that is opposite of a direction in which the antenna supports of the second harmonic repeater extend and wherein the harmonic repeaters operate at different frequencies from each other.

2. The transceiver of claim 1, wherein the antenna supports extend along a direction that is orthogonal to a plane in which their associated base substrate lies.

3. The transceiver of claim 2, wherein the antenna supports comprise planar substrates.

4. The transceiver of claim 1, wherein the transceiver fits within a spherical volume having a diameter of approximately 1.5 to 4 cm.

5. The transceiver of claim 1, wherein each antenna comprises a meandered monopole antenna that extends along a length direction of its associated antenna support.

6. The transceiver of claim 5, wherein each antenna is wider near its associated base substrate than at a distal tip of the antenna.

7. The transceiver of claim 1, wherein the frequency multipliers double the frequency of the received signals.

8. The transceiver of claim 1, wherein the frequency multipliers comprise Schottky barrier diodes.

9. The transceiver of claim 1, wherein each harmonic repeater further comprises a first feeding network formed on its base substrate that connects its receive antenna to its frequency multiplier and a second feeding network formed on its base substrate that connects its transmit antenna to its frequency multiplier.

* * * * *